(12) United States Patent
Kikuchi (10) Patent No.: US 8,170,363 B2
(45) Date of Patent: May 1, 2012

(54) IMAGE PROCESSING APPARATUS FOR PERFORMING DEBLOCKING FILTERING PROCESS

(75) Inventor: Yu Kikuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1145 days.

(21) Appl. No.: 11/783,616

(22) Filed: Apr. 10, 2007

(65) Prior Publication Data

US 2008/0013855 A1 Jan. 17, 2008

(30) Foreign Application Priority Data

Apr. 11, 2006 (JP) ................................. 2006-108477

(51) Int. Cl.
*G06K 9/40* (2006.01)
(52) U.S. Cl. ........ 382/268; 382/232; 382/254; 382/260; 382/266; 382/275; 375/240; 375/240.24; 375/240.25; 375/240.29
(58) Field of Classification Search ........................ None
See application file for complete search history.

(56) References Cited

U.S. PATENT DOCUMENTS

| 2004/0126034 | A1* | 7/2004 | Yu et al. ......................... 382/260 |
| 2006/0029288 | A1* | 2/2006 | Li .................................. 382/268 |
| 2006/0078052 | A1* | 4/2006 | Dang ........................ 375/240.24 |
| 2006/0115002 | A1 | 6/2006 | Kim et al. |
| 2006/0133504 | A1 | 6/2006 | Jung et al. |
| 2006/0147123 | A1* | 7/2006 | Kajihata ........................ 382/239 |

FOREIGN PATENT DOCUMENTS

| JP | 59-109969 A | 6/1984 |
| JP | 6-342467 A | 12/1994 |
| JP | 09-107520 A | 4/1997 |
| JP | 11-252549 A | 9/1999 |
| JP | 2005-070938 A | 3/2005 |
| JP | 2006-157925 A | 6/2006 |
| JP | 2006-174486 A | 6/2006 |

OTHER PUBLICATIONS

Li et al. "An Efficient Deblocking Filter Architecture with 2-Dimensional Parallel Memory for H.264/AVC" IEEE Transactions on Consumer Electronics, vol. 50, No. 1, 2004.*
Bojnordi et al. "An Efficient Deblocking Filter with Self-Transposing Memory Architecture for H.264/AVC", ICASSP 2006.*
Sima et al. "An Efficient Architecture for Adaptive Deblocking Filter of H.264/AVC Video Coding" IEEE Transactions on Consumer Electronics, vol. 50, No. 1, Feb. 2004.*
International Telecommunication Union, ITU-T, "Series H: Audiovisual and Multimedia Systems, Infrastructure of audiovisual services—Coding of moving video", H.264, (May 2003), 282 pages.

* cited by examiner

*Primary Examiner* — Sath V Perungavoor
*Assistant Examiner* — Jason Heidemann
(74) *Attorney, Agent, or Firm* — Foley & Lardner LLP (57) ABSTRACT

According to the present invention, there is provided a image processing apparatus comprising:
  at least one memory which stores data of each of at least a first image and a second image having no dependence upon each other's data;
  a memory access unit which reads out the data from and writes the data in said memory; and
  a filtering processing unit which receives the data read out by said memory access unit, performs a deblocking filtering process on the received data, and supplies the processed data to said memory access unit,
wherein said filtering processing unit alternately performs a deblocking filtering process on at least one block boundary of the first image, and a deblocking filtering process on at least one block boundary of the second image.

14 Claims, 10 Drawing Sheets

IMAGE PROCESSING APPARATUS FOR PERFORMING DEBLOCKING FILTERING PROCESS

CROSS REFERENCE TO RELATED APPLICATION

This application is based upon and claims benefit of priority under 35 USC §119 from the Japanese Patent Application No. 2006-108477, filed on Apr. 11, 2006, the entire contents of which are incorporated herein by reference.

BACKGROUND OF THE INVENTION

The present invention relates to an image processing apparatus.

In image processing, performing compression on, e.g., every 4×4 pixels as one block unit produces block edges noise in the horizontal and vertical block boundaries of the four sides surrounding the block. To remove this block edges noise, a deblocking filtering process is performed to make the block boundaries inconspicuous.

Pixels are classified into a Y image (luma component), Cb image (chroma component Cb), and Cr image (chroma component Cr), and the deblocking filtering process must be performed on the vertical and horizontal block boundaries of a block including 4×4 pixels as a minimum unit for each of the Y, Cb, and Cr images.

For example, the deblocking filtering process is performed on one vertical block boundary of a block including 4×4 pixels by using data stored in a total of eight pixels arranged four by four on the right and left sides of this vertical block boundary.

First, the data of a total of eight pixels of one vertical block boundary are added to obtain, e.g., an average value, and the pixel data of the eight pixels are corrected by using this average value. This makes it possible to eliminate the discontinuity of data existing in the vertical block boundary.

The deblocking filtering process is performed on the block boundaries of four pixels existing in the vertical block boundaries by performing the above operation four times in the vertical direction.

After that, the deblocking filtering process is similarly performed on one horizontal block boundary of the block. This process uses data stored in a total of eight pixels arranged four by four above and below the horizontal block boundary.

Then, as in the case of the vertical direction, an average value, for example, is obtained from the data of a total of eight pixels of one horizontal block boundary, and the pixel data of the eight pixels are corrected by using this average value. Consequently, the discontinuity of data existing in the horizontal block boundary can be eliminated.

The deblocking filtering process is performed on the block boundaries of four pixels existing in the horizontal block boundaries by performing the above operation four times in the horizontal direction.

The above operations in the vertical and horizontal directions are executed for each of the Y, Cb, and Cr images, thereby completing the deblocking filtering process of the block including 4×4 pixels.

As described above, the processing amount of the deblocking filtering process is large. Also, when H.264 is used as coding standards, the standards define the deblocking filtering process having a large processing amount. In addition, the processing amount of the deblocking filtering process itself is larger than those of the existing coding standards because the block size is 4×4 pixels, i.e., smaller than 8×8 pixels of MPEG-4. That is, the amount of processing performed on the entire image is at least fourfold. Furthermore, the number of pixels increases as the TV screen size increases, so a demand has arisen for image processing corresponding to the increased number of pixels. This also increases the processing amount of the deblocking filtering process.

For this reason, it is expected to increase the processing efficiency of the deblocking filtering process by using pipeline processing.

When continuously performing the deblocking filtering process on, e.g., the vertical block boundaries of the Y image, however, unless all pixels in a vertical block boundary currently being processed by the deblocking filtering process are completely processed, values to be used in the next adjacent vertical block boundary are undetermined. This is so because there is a dependence on data. This makes it impossible to continuously execute the deblocking filtering process on the next adjacent vertical block boundary.

Accordingly, even when the number of pipeline stages is increased by using pipeline processing in the deblocking filtering process, a pipeline stall occurs, and this lowers the processing efficiency.

As has been explained above, the processing amount of the H.264 deblocking filtering process is very large, so it is desirable to increase the processing efficiency by using pipeline processing. However, it is still difficult to increase the processing efficiency of the deblocking filtering process even if the number of pipeline stages increases.

Furthermore, when accessing a memory storing image data, complicated processing is necessary to successively read out the image data in either the vertical or horizontal direction of the image. Memory access apparatuses for solving this problem are also disclosed (e.g., patent references 1 and 2).

Unfortunately, these memory access apparatuses require new registers, and cannot increase the processing efficiency of the deblocking filtering process.

Patent reference 1: Japanese Patent Laid-Open No. 6-342467
Patent reference 2: Japanese Patent Laid-Open No. 59-109969

SUMMARY OF THE INVENTION

According to one aspect of the invention, there is provided an image processing apparatus comprising:

at least one memory which stores data of each of at least a first image and a second image having no dependence upon each other's data;

a memory access unit which reads out the data from and writes the data in said memory; and a filtering processing unit which receives the data read out by said memory access unit, performs a deblocking filtering process on the received data, and supplies the processed data to said memory access unit, wherein said filtering processing unit alternately performs a deblocking filtering process on at least one block boundary of the first image, and a deblocking filtering process on at least one block boundary of the second image.

DETAILED DESCRIPTION OF THE INVENTION

An embodiment of the present invention will be explained below with reference to the accompanying drawings.

An image filtering apparatus according to this embodiment executes a deblocking filtering process on encoded (compressed) image data. The deblocking filtering process is processing executed on an image obtained by decoding (decompressing) encoded (compressed) image data. The deblocking filtering process reduces block edges noise of the decoded image. Examples of the encoded (compressed) image data are images compressed by using H.264, MPEG standards (e.g., MPEG-1, MPEG-2, and MPEG-4), and other standards.

(Arrangement of Image Filtering Apparatus)

Figure 1:
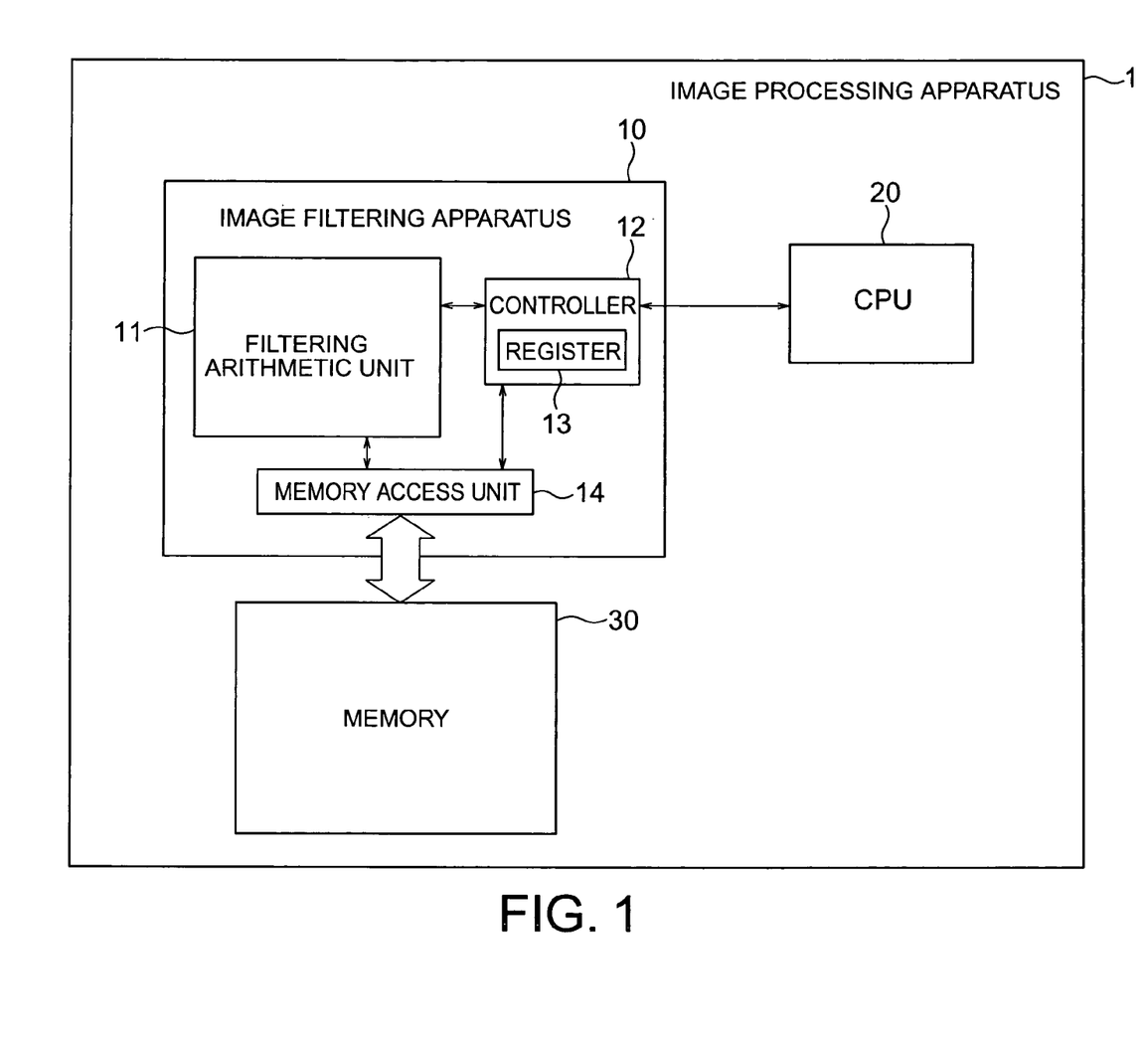
FIG. 1 is a block diagram showing the arrangements of an image filtering apparatus and an image processing apparatus including it according to an embodiment of the present invention.

FIG. 1 shows the arrangements of the image filtering apparatus and an image processing apparatus including it according to this embodiment. An image processing apparatus 1 comprises an image filtering apparatus 10, CPU (Central Processing Unit) 20, and memory 30. The image filtering apparatus 10 has a filtering processing unit 11, controller 12, and memory access unit 14. The controller 12 includes a register 13.

The CPU 20 outputs, to the image filtering apparatus 10, various signals such as a start signal for starting the deblocking filtering process, a reset signal for stopping the process, and block boundary filtering strength variable BS.

The block boundary filtering strength variable BS is a value set for each block boundary to designate weighting in the deblocking filtering process. Details will be described later.

The controller 12 in the image filtering apparatus 10 controls the whole image filtering apparatus 10 on the basis of signals supplied from the CPU 20. The controller 12 also stores the block boundary filtering strength variable BS supplied from the CPU 20 in the built-in register 13.

The memory access unit 14 accesses the memory 30 to read out stored data, and outputs the readout data to the filtering processing unit 11. The memory access unit 14 also writes data supplied from the filtering processing unit 11 in the memory 30.

The filtering processing unit 11 filters data supplied from the memory access unit 14 by using the block boundary filtering strength variable BS stored in the register 13, and outputs the filtered data to the memory access unit 14.

Figure 2:
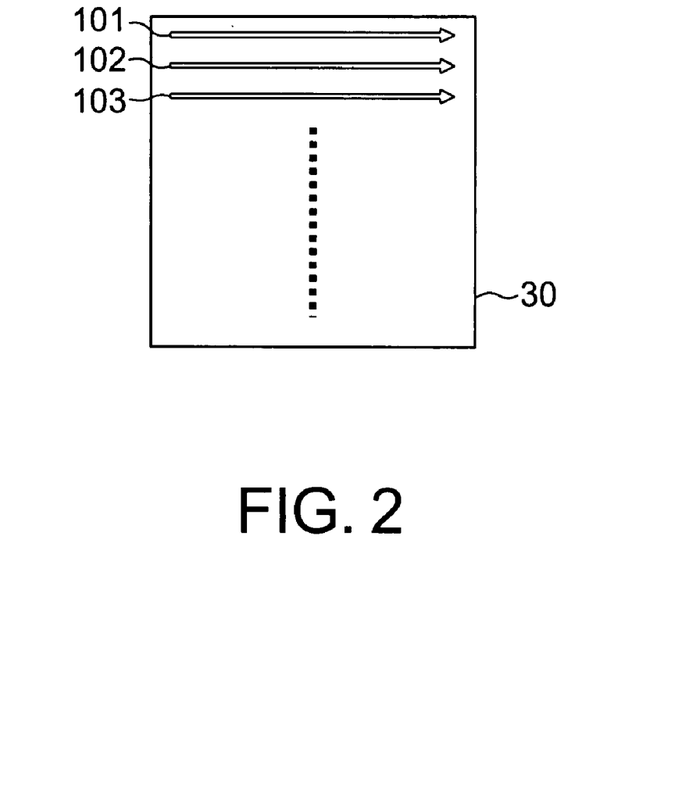
FIG. 2 is a view for explaining horizontal data read in a rotating memory.

A rotating memory is used as the memory 30. Similar to an ordinary memory, when reading out data in the horizontal direction as shown in FIG. 2, the data can be successively read out from the rotating memory by only designating the addresses of first pixels 101, 102, 103, . . . .

Figure 3:
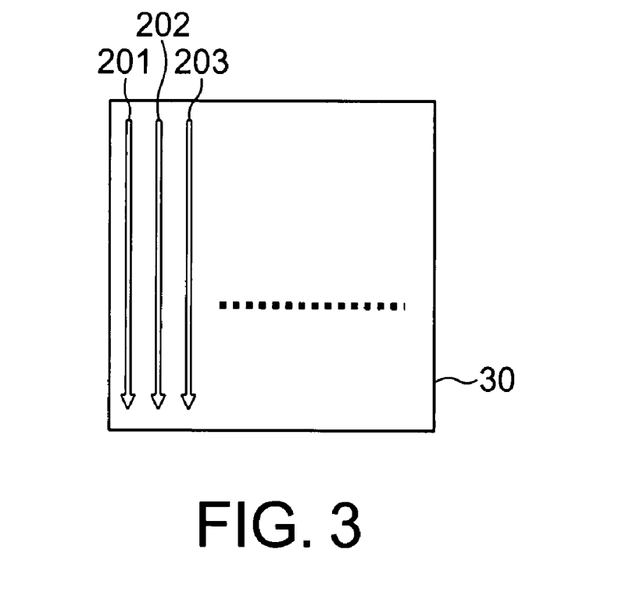
FIG. 3 is a view for explaining vertical data read in the rotating memory.

Also, unlike an ordinary memory, when reading out data in the vertical direction as shown in FIG. 3, the data can be successively read out from the rotating memory by only designating the addresses of first pixels 201, 202, 203, . . . .

That is, data can be successively read out from the rotating memory in both the horizontal and vertical directions. When the rotating memory is used, therefore, data of a predetermined number of pixels, e.g., four pixels can be successively read out in either the horizontal or vertical direction by only designating the address of a first pixel once.

In an ordinary memory, data of four pixels can be successively read out in the horizontal direction, i.e., so-called horizontal read can be performed by only designating the address of a first pixel once. However, no successive vertical read can be performed in the vertical direction; the address of each individual pixel must be designated each time. This lowers the processing speed compared to that of the rotating memory.

(Deblocking Filtering Process & Layouts of Images in Memory)

The case that this embodiment is applied to an image encoded by the H.264 standards will be explained below.

First, H.264 has a Y image, Cb image, and Cr image. A basic unit of pixels that are processed at once by the deblocking filtering process is determined for each of the Y, Cb, and Cr images. This basic unit is called a macro block.

Figure 4:
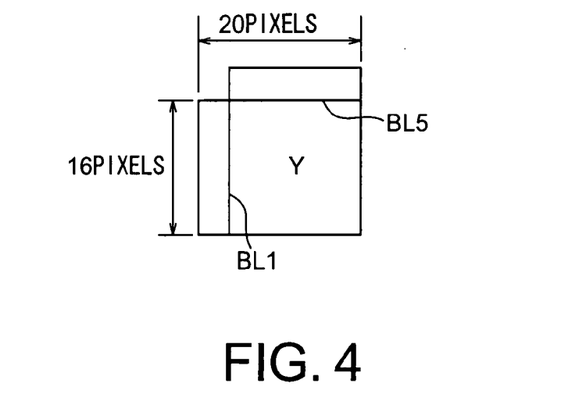
FIG. 4 is a view showing a layout when storing a Y image for every 16×16 pixels as one unit in the rotating memory.

FIG. 4 shows a layout example when storing the Y image in the rotating memory 30.

When performing the deblocking filtering process on block boundaries of the Y image, the unit is 16×16 pixels. This unit of 16×16 pixels is the macro block of the Y image. Also, to perform the deblocking filtering process on a vertical block boundary BL1 in the leftmost position, an area of four pixels is necessary on the left side of the boundary. Likewise, to perform the deblocking filtering process on a horizontal block boundary BL5 in the uppermost position, an area of four pixels is necessary above the boundary. Consequently, an area of 20×20 pixels is necessary as a whole. These 20×20 pixels form a processing unit by which the deblocking filtering process is performed on the Y image.

Figure 5:
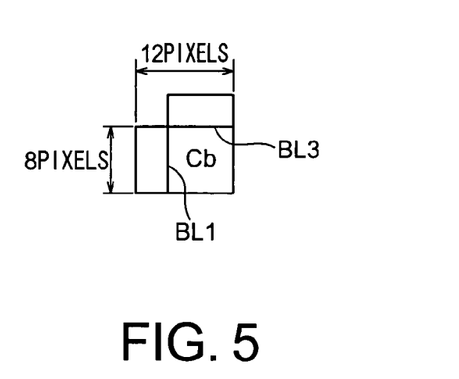
FIG. 5 is a view showing a layout when storing a Cb image for every 8×8 pixels as one unit in the rotating memory.

FIG. 5 shows a layout example when storing the Cb image in the rotating memory 30. When performing the deblocking filtering process on block boundaries of the Cb image, the unit is 8×8 pixels. This unit of 8×8 pixels is the macro block of the Cb image. Also, to perform the deblocking filtering process on a vertical block boundary BL1 in the leftmost position, an area of four pixels is necessary on the left side of the boundary. Likewise, to perform the deblocking filtering process on a horizontal block boundary BL3 in the uppermost position, an area of four pixels is necessary above the boundary. Therefore, an area of 12×12 pixels is necessary as a whole. These 12×12 pixels form a processing unit by which the deblocking filtering process is performed on the Cb image.

Figure 6:
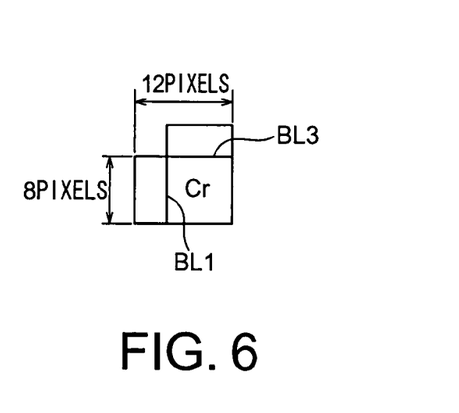
FIG. 6 is a view showing a layout when storing a Cr image for every 8×8 pixels as one unit in the rotating memory.

FIG. 6 shows a layout example when storing the Cr image in the rotating memory 30. When performing the deblocking filtering process on block boundaries of the Cr image, the unit is 8×8 pixels. This unit of 8×8 pixels is the macro block of the Cr image. Similar to the Cb image, the Cr image requires an area of 12×12 pixels as a whole. These 12×12 pixels form a processing unit by which the deblocking filtering process is performed on the Cr image.

The H.264 standards define the macro blocks and the processing blocks of the deblocking filtering process of the Y, Cb, and Cr images explained above.

Figure 7:
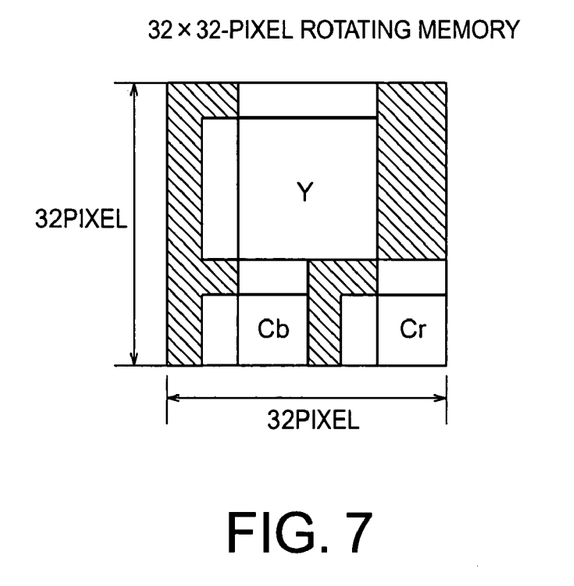
FIG. 7 is a view showing a layout example when storing a Y image, Cb image, and Cr image in the rotating memory.

FIG. 7 shows a layout example when the Y, Cb, and Cr images are arranged as a set. An area of 32×32 pixels is necessary as a whole.

Figure 8:
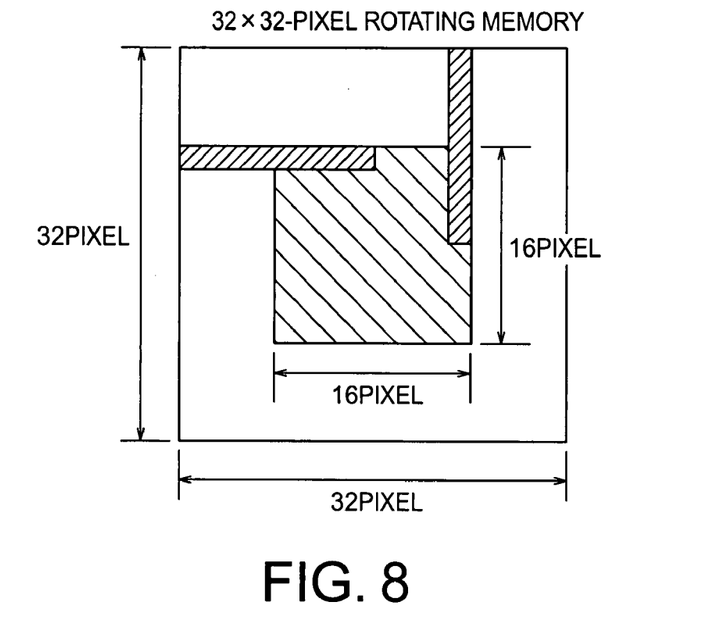
FIG. 8 is a view showing a layout example when storing an image of 16×16 pixels in the rotating memory.

FIG. 8 shows a layout example when storing an image of 16×16 pixels in the rotating memory. Similar to H.264, a maximum macro block of the Y image includes a maximum of 16×16 pixels in the MPEG standards such as MPEG-1, MPEG-2, and MPEG-4. Accordingly, an area of 32×32 pixels is necessary as a whole when executing the deblocking filtering process in all the four directions, i.e., upward, downward, rightward, and leftward.

As shown in FIGS. 7 and 8, therefore, when a memory having 32×32 pixels is used as the rotating memory 30, the deblocking filtering process can be executed on images having a macro block of 16×16 pixels such as MPEG images in addition to H.264 images. This technique is used to provide, e.g., an apparatus corresponding to H.264 and having compatibility to the existing MPEG standards.

(Sequence of Deblocking Filtering Process)

The sequence of execution of the deblocking filtering process on all block boundaries of the Y, Cb, and Cr images will be explained below with reference to FIGS. 9 to 15. The H.264 standards define this sequence of the deblocking filtering process.

First, in H.264, a boundary over 4×4 pixels produces block boundary noise.

A block boundary having this pixel size produces noise because encoding and decoding are performed for every 4×4 pixels and this readily produces a difference between pixel values in a boundary over 4×4 pixels. Accordingly, an image processing apparatus that executes the deblocking filtering process on H.264 must perform the process with a size of 4×4 pixels.

That is, in H.264, the macro block is divided into 4×4-pixel blocks, and the deblocking filtering process is executed on boundaries between the divided blocks.

Figure 9:
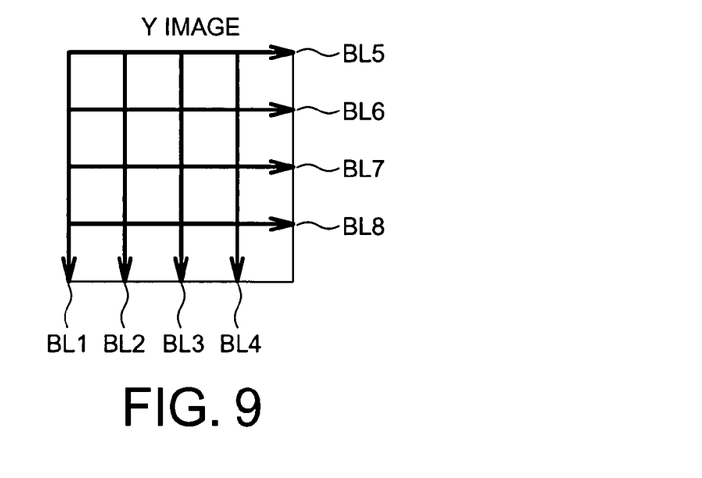
FIG. 9 is a view showing the order of block boundaries when performing a deblocking filtering process on the Y image.

FIG. 9 shows the sequence when performing the deblocking filtering process on all block boundaries in the Y image.

As shown in FIG. 9, the Y image having a macro block of 16×16 pixels is divided into 4×4-pixel blocks. That is, the Y image is divided into a total of 16 blocks each having 4×4 pixels. Accordingly, the image is divided by four block boundaries BL1 to BL4 in the vertical direction, and four block boundaries BL5 to BL8 in the horizontal direction.

The vertical block boundaries are processed one by one from the left to the right, i.e., from BL1 to BL4. After that, the horizontal block boundaries are processed one by one downward, i.e., from BL5 to BL8.

Figure 10:
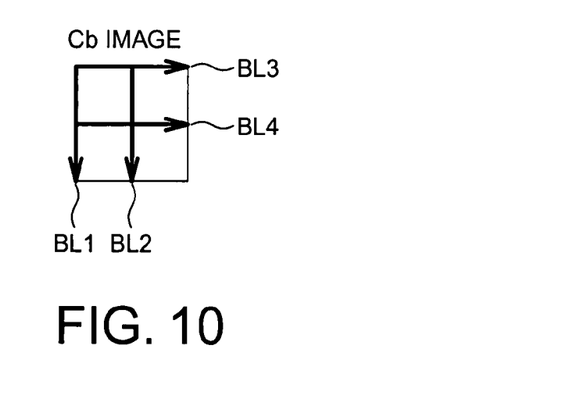
FIG. 10 is a view showing the order of block boundaries when performing a deblocking filtering process on the Cb image.

FIG. 10 shows the sequence when performing the deblocking filtering process on all block boundaries in the Cb image.

As shown in FIG. 10, the Cb image having a macro block of 8×8 pixels is divided into 4×4-pixel blocks. That is, the Cb image is divided into a total of four blocks each having 4×4 pixels. Accordingly, the image is divided by two block boundaries BL1 and BL2 in the vertical direction, and two block boundaries BL3 and BL4 in the horizontal direction.

The vertical block boundaries are processed one by one from the left to the right, i.e., from BL1 to BL2. After that, the horizontal block boundaries are processed one by one downward, i.e., from BL3 to BL4.

Figure 11:
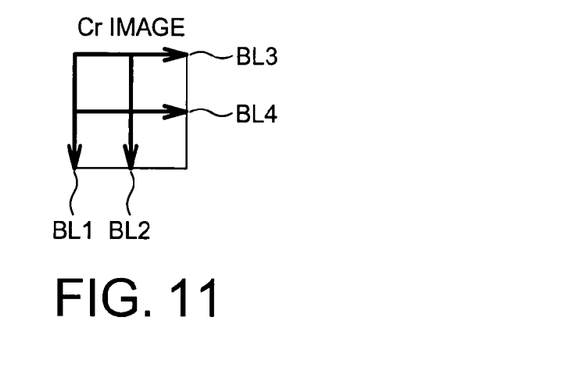
FIG. 11 is a view showing the order of block boundaries when performing a deblocking filtering process on the Cr image.

FIG. 11 shows the sequence when performing the deblocking filtering process on all block boundaries in the Cr image.

As shown in FIG. 11, the Cr image having a macro block of 8×8 pixels is divided into 4×4-pixel blocks. That is, the Cr image is divided into a total of four blocks each having 4×4 pixels. Accordingly, the image is divided by two block boundaries BL1 and BL2 in the vertical direction, and two block boundaries BL3 and BL4 in the horizontal direction.

When performing the deblocking filtering process on all the block boundaries in the Cr image shown in FIG. 11, similar to the Cb image, the vertical block boundaries are processed one by one from the left to the right, i.e., from BL1 to BL2. After that, the horizontal block boundaries are processed one by one downward, i.e., from BL3 to BL4.

Figure 12:
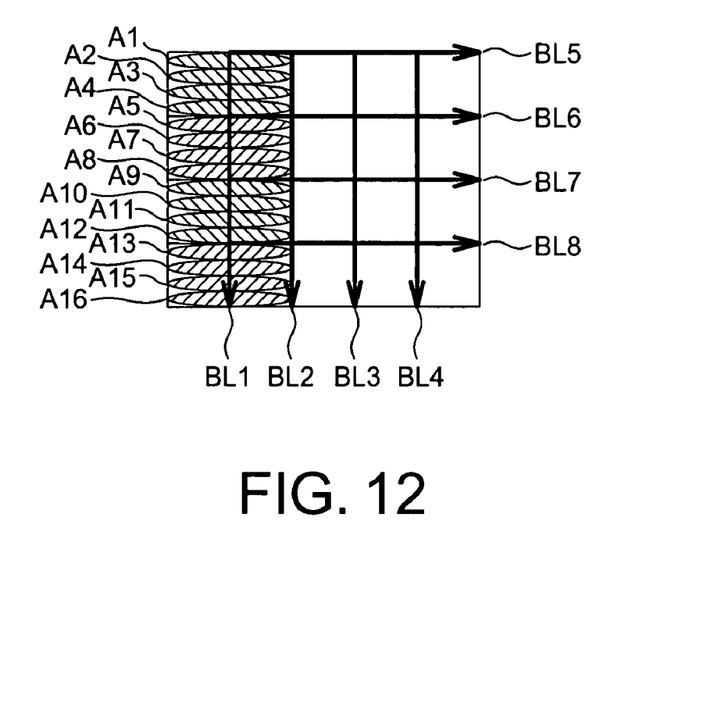
FIG. 12 is a view showing the order of pixels when performing the deblocking filtering process on a block boundary BL1 of the Y image.

FIG. 12 shows pixels storing data used to perform the deblocking filtering process on the block boundary BL1 of the Y image.

Along the vertical block boundary BL1, four pixel groups are arranged in each block, so a total of 16 pixel groups A1 to A16 exist. First, the deblocking filtering process is performed on an uppermost boundary of the block boundary BL1. This process is done by using data stored in the pixel group A1 having a total of eight pixels arranged four by four on the right and left sides of the boundary.

Then, the deblocking filtering process is performed on a second boundary from the uppermost one of the block boundary BL1 by using data stored in the pixel group A2 having a total of eight pixels arranged four by four on the right and left sides of the boundary.

Likewise, the deblocking filtering process is performed on a third boundary from the uppermost one of the block boundary BL1 by using data stored in the pixel group A3 having a total of eight pixels across the boundary. The deblocking filtering process is similarly performed on fourth to 16th boundaries of the block boundary BL1 by using data stored in the pixel groups A4 to A16 each having a total of eight pixels across the corresponding boundary.

Figure 13:
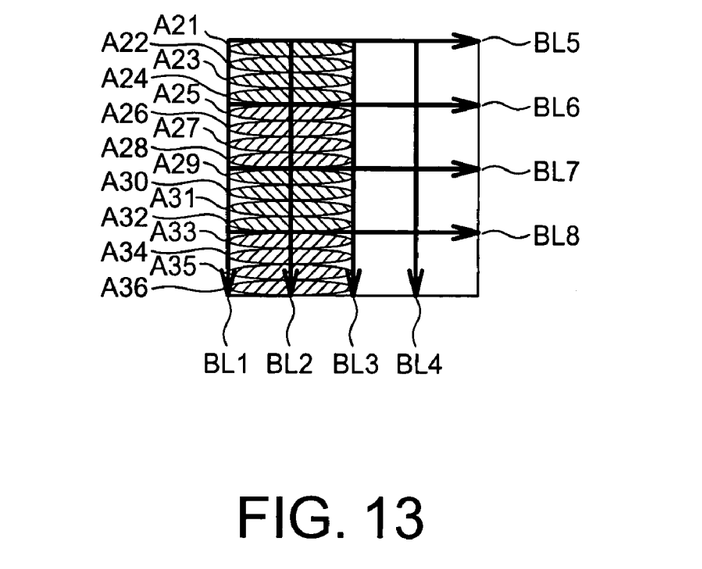
FIG. 13 is a view showing the order of pixels when performing the deblocking filtering process on a block boundary BL2 of the Y image.

FIG. 13 shows pixels storing data used to perform the deblocking filtering process on the vertical block boundary BL2 of the Y image.

The deblocking filtering process is performed on an uppermost boundary of the block boundary BL2 by using data stored in a pixel group A21 having a total of eight pixels across the boundary. The deblocking filtering process is then sequentially performed by using data stored in pixel groups A22 to A36 each having eight pixels across the corresponding one of second to 16th boundaries.

Likewise, the deblocking filtering process is performed on the vertical block boundaries BL3 and BL4.

Figure 14:
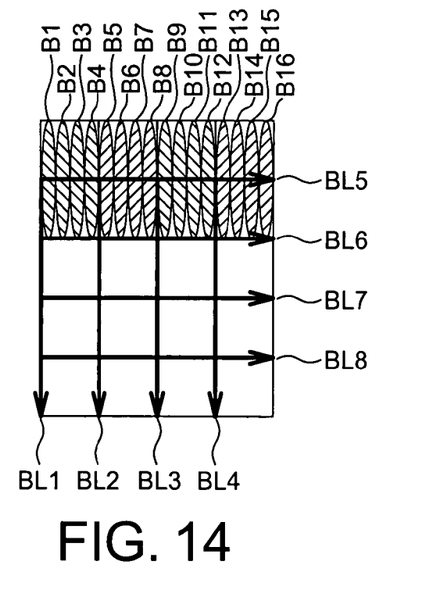
FIG. 14 is a view showing the order of pixels when performing the deblocking filtering process on a block boundary BL5 of the Y image.

Then, as shown in FIG. 14, when performing the deblocking filtering process on the horizontal block boundary BL5 of the Y image, the process is performed on a leftmost boundary by using data stored in a pixel group B1 having a total of eight pixels across this boundary. Also, the deblocking filtering process is sequentially performed by using data stored in pixel groups B2 to B16 each having eight pixels across the corresponding one of second to 16th boundaries.

Figure 15:
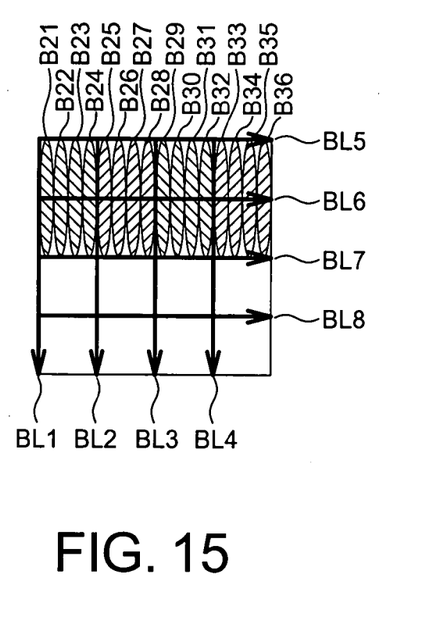
FIG. 15 is a view showing the order of pixels when performing the deblocking filtering process on a block boundary BL6 of the Y image.

Similarly, as shown in FIG. 15, the deblocking filtering process is performed on the horizontal block boundary BL6 by using data stored in a pixel group B21 having a total of eight pixels across this boundary. Also, the deblocking filtering process is sequentially performed by using data stored in pixel groups B22 to B36 each having eight pixels across the corresponding one of second to 16th boundaries. The deblocking filtering process is analogously performed on the horizontal block boundaries BL7 and BL8, thereby completing the processing of the Y image.

Subsequently, of the block boundaries BL1 to BL4 of the Cb image, the vertical block boundaries BL1 and BL2 are each processed eight times by using eight pixels across the boundary, and the horizontal block boundaries BL3 and BL4 are each processed eight times by using eight pixels across the boundary, thereby completing the deblocking filtering process of the Cb image.

Similar to the Cb image, of the block boundaries BL1 to BL4 of the Cr image, the vertical block boundaries BL1 and BL2 are each processed eight times by using eight pixels across the boundary, and the horizontal block boundaries BL3 and BL4 are each processed eight times by using eight pixels across the boundary, thereby completing the deblocking filtering process of the Cr image.

(Block Boundary Filtering Strength Variable BS)

Figure 16:
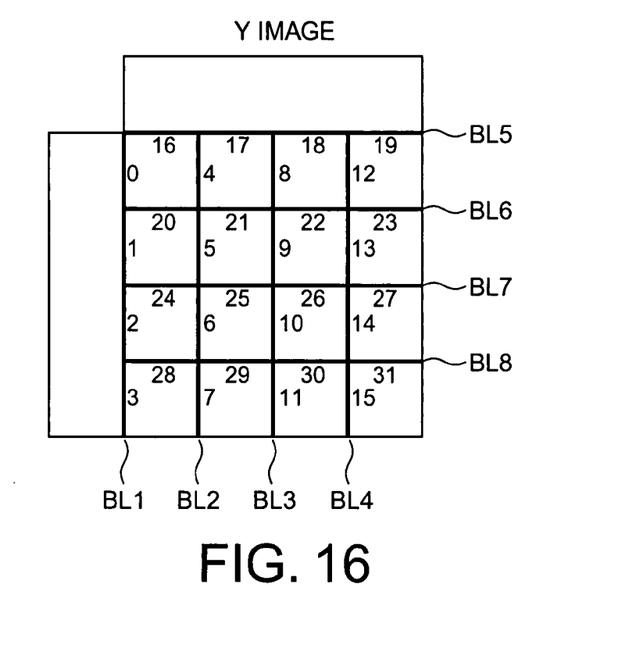
FIG. 16 is a view showing the relationship between each block boundary and block boundary filtering strength variable BS in the Y image.
Figure 17:
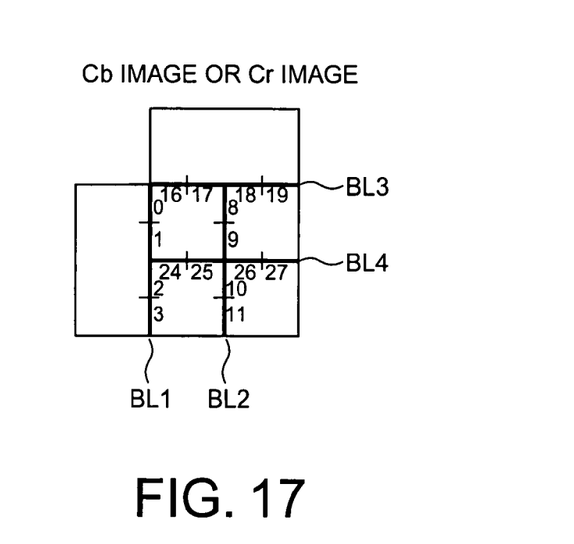
FIG. 17 is a view showing the relationship between each block boundary and the block boundary filtering strength variable BS in the Cb or Cr image.

FIG. 16 shows the relationship between each of the block boundaries BL1 to BL8 in the Y image and the block boundary filtering strength variable BS. FIG. 17 shows the relationship between each of the block boundaries BL1 to BL4 in the Cb or Cr image and the block boundary filtering strength variable BS.

The block boundary filtering strength variable BS is a value that designates the strength of the deblocking filtering process to be performed on a block boundary, i.e., designates weighting in the deblocking filtering process, and is set for each block boundary. Also, the block boundary filtering strength variable BS is set for each macro block described above.

As shown in FIG. 16, boundary positions (0), (1), (2), and (3) are designated in this order from above for the vertical block boundary BL1 in the Y image. Likewise, boundary positions (4), (5), (6), and (7) are designated in this order from above for the vertical block boundary BL2, boundary positions (8), (9), (10), and (11) are designated in this order from above for the vertical block boundary BL3, and boundary positions (12), (13), (14), and (15) are designated in this order from above for the vertical block boundary BL4.

In addition, boundary positions (16) to (19), (20) to (23), (24) to (27), and (28) to (31) are designated from the left to the right in FIG. 16 for the horizontal block boundary lines BL5, BL6, BL7, and BL8, respectively.

The block boundary filtering strength variable BS is set for each of 32 boundary positions (0) to (31).

As shown in FIG. 17, in the Cb or Cr image, four equally divided boundary positions (0) to (3) are designated in this order from above for the vertical block line BL1, and four equally divided boundary positions (8) to (11) are designated in this order from above for the vertical block boundary BL2. Similarly, four equally divided boundary positions (16) to (19) are designated in this order from the left to the right for the horizontal block boundary BL3, and four equally divided boundary positions (24) to (27) are designated in this order from the left to the right for the horizontal block boundary BL4.

In boundary positions (0) to (27) in the Cb or Cr image, the same block strength BS as in the Y image shown in FIG. 16 is set for each boundary position having the same number as in the Y image shown in FIG. 16.

The H.264 standards define the block boundary filtering strength variable BS explained above.

(Sequence of Deblocking Filtering Process According to Embodiment)

Figure 18:
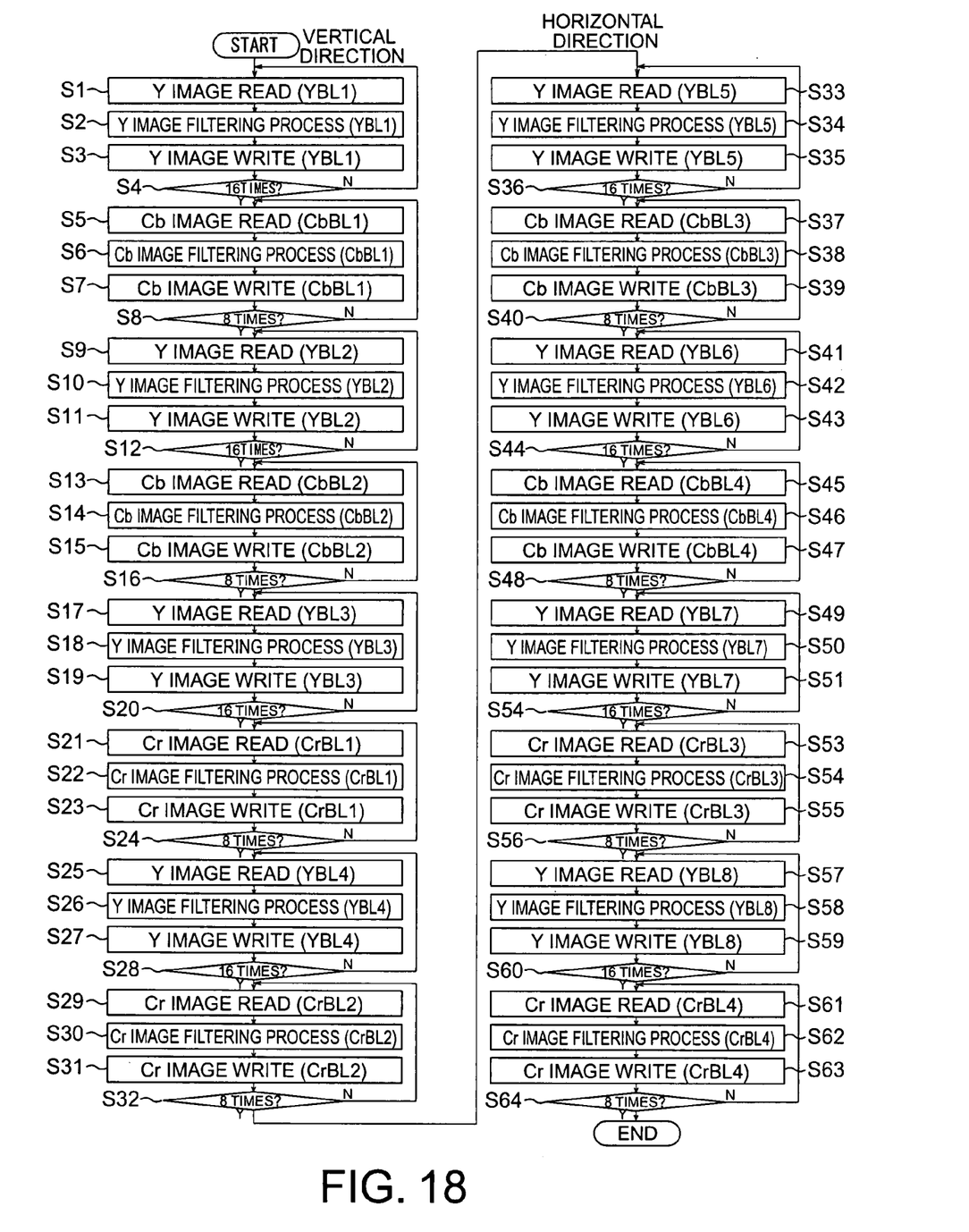
FIG. 18 is a flowchart showing the sequence of processing performed by the image filtering apparatus according to the embodiment.

FIG. 18 is a flowchart showing the sequence of the deblocking filtering process according to this embodiment. Referring to FIG. 18, the deblocking filtering process is performed on vertical block boundaries of the Y, Cb, and Cr images in steps S1 to S31, and on horizontal block boundaries in steps S33 to S63.

First, the memory 30 altogether stores data of the processing blocks by which the deblocking filtering process is performed on the Y, Cb, and Cr images. The block boundary strengths BS of (0) to (31) are determined in accordance with the data stored in the memory 30, and are stored in the register 13. Then, the deblocking filtering processing is executed on the data stored in the memory 30 in accordance with the flowchart shown in FIG. 18.

First, in step S1, the memory access unit 14 reads out, from the memory 30, data of eight pixels (A1 in FIG. 12) in the uppermost stage of the block boundary BL1 in the Y image, and transfers the readout data to the filtering processing unit 11.

In step S2, the filtering processing unit 11 performs the deblocking filtering process by pipeline processing by using the data read out from the memory 30 and the block boundary strengths BS read out from the register 13. This pipeline processing will be described later.

In step S3, data having undergone the deblocking filtering process is supplied to the memory access unit 14, and written in the memory 30.

In step S4, whether the operation from steps S1 to S3 is completely performed on 16 pixels along the block boundary BL1 is determined. If YES in step S4, the process advances to step S5.

In steps S5 to S7, the deblocking filtering process is performed on the block boundary BL1 of the Cb image. In step S5, the memory access unit 14 reads out, from the memory 30, data of eight pixels in the uppermost stage of the block boundary BL1 in the Cb image, and transfers the readout data to the filtering processing unit 11.

In step S6, the filtering processing unit 11 performs the deblocking filtering process by using the data read out from the memory 30 and the block boundary strengths BS.

In step S7, data having undergone the deblocking filtering process is supplied to the memory access unit 14, and written in the memory 30.

In step S8, whether the operation from steps S5 to S7 is completely performed on eight pixels along the block boundary BL1 is determined. If YES in step S8, the process advances to step S9.

In steps S9 to S11, the process returns to the Y image to perform the deblocking filtering process 16 times on the block boundary BL2, and then advances to step S13.

In steps S13 to S15, the process returns to the Cb image to perform the deblocking filtering process eight times on the block boundary BL2 of the Cb image and write the data in the memory 30, and then advances to step S17.

In steps S17 to S19, the process returns to the Y image again to perform the deblocking filtering process 16 times on the block boundary BL3 and write the data in the memory 30, and then advances to step S21.

In steps S21 to S23, the process advances to the Cr image to perform the deblocking filtering process eight times on the block boundary BL1 of the Cr image and write the data in the memory 30, and then advances to step S25.

In steps S25 to S27, the process returns to the Y image again to perform the deblocking filtering process 16 times on the block boundary BL4 and write the data in the memory 30, and then advances to step S29.

In steps S29 to S31, the process returns to the Cr image to perform the deblocking filtering process eight times on the block boundary BL2 of the Cr image and write the data in the memory 30, and then advances to step S33.

In steps S33 to S35, the deblocking filtering process is performed 16 times on the vertical block boundary BL5 of the Y image, the data is written in the memory 30, and the process advances to step S37.

In steps S37 to S39, the process advances to the Cb image to perform the deblocking filtering process eight times on the vertical block boundary BL3 of the Cb image and write the data in the memory 30, and then advances to step S41.

In steps S41 to S43, the deblocking filtering process is performed 16 times on the block boundary BL6 of the Y image, the data is written in the memory 30, and the process advances to step S45.

In steps S45 to S47, the process advances to the Cb image to perform the deblocking filtering process eight times on the block boundary BL4 of the Cb image and write the data in the memory 30, and then advances to step S49.

In steps S49 to S51, the deblocking filtering process is performed 16 times on the block boundary BL7 of the Y image, the data is written in the memory 30, and the process advances to step S53.

In steps S53 to S55, the process advances to the Cr image to perform the deblocking filtering process eight times on the block boundary BL3 of the Cr image and write the data in the memory 30, and then advances to step S57.

In steps S57 to S59, the deblocking filtering process is performed 16 times on the block boundary BL8 of the Y image, the data is written in the memory 30, and the process advances to step S61.

In steps S61 to S63, the process advances to the Cr image again to perform the deblocking filtering process eight times on the block boundary BL4 of the Cr image and write the data in the memory 30, thereby completing the processing.

As has been explained above, this embodiment alternately executes the deblocking filtering process on one block boundary of a certain image and that on one block boundary of another image having no dependence upon data of the former image. For example, this embodiment alternately executes the deblocking filtering process on one block boundary of the Y image, and the deblocking filtering process on one block boundary of the Cb or Cr image having no dependence upon data of the Y image.

The effect of this processing significantly appears when compared with the case that the deblocking filtering process is continuously executed on adjacent block boundaries. First, unless all pixels in a vertical or horizontal block boundary currently being processed by the deblocking filtering processing are completely processed, values to be used in a next adjacent vertical or horizontal block boundary are undetermined. This means that images have a dependence on data. Therefore, when continuously performing the deblocking filtering process on a vertical block boundary of the Y image, for example, the dependence on data makes it impossible to continuously execute the deblocking filtering process on the next adjacent vertical block boundary.

On the other hand, this embodiment can execute the deblocking filtering process on the Cb or Cr image even when the deblocking filtering process in the vertical direction of the Y image is not complete. This makes it possible to increase the processing efficiency of the deblocking filtering process by combining it with pipeline processing to be explained next.

Also, this embodiment executes the deblocking filtering process on data corresponding to the processing unit by which the deblocking filtering process is performed on each of the Y, Cb, and Cr images. Since the deblocking filtering process of each of the Y, Cb, and Cr images shares the block boundary filtering strength variable BS, therefore, it is unnecessary to set the same block boundary filtering strength variable BS for the deblocking filtering process of each of the Y, Cb, and Cr images. Consequently, the processing efficiency of the deblocking filtering process can be increased.

Note that this embodiment executes the deblocking filtering process in the order of the Y, Cb, and Cr images. However, another embodiment is also possible as long as deblocking filtering processes of images having no dependence on each other's data are alternately executed. For example, the deblocking filtering process may also be executed in the order of the Y, Cr, and Cb images, the order of the Cr, Y, and Cb images, or another order.

(Pipeline Processing)

Figure 19:
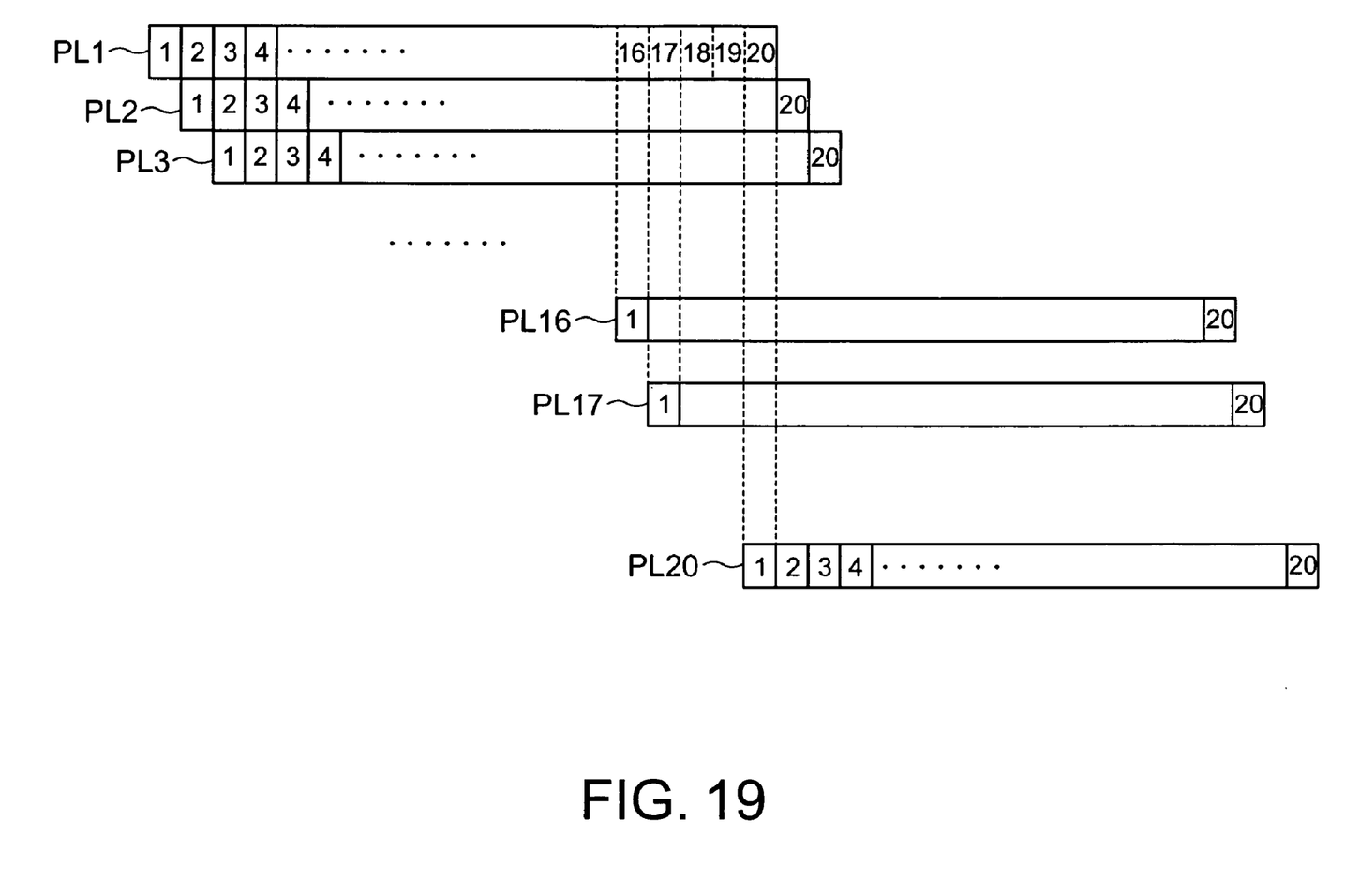
FIG. 19 is a view showing a pipeline structure in the image filtering apparatus according to the embodiment.

The pipeline processing performed by the filtering processing unit 11 of this embodiment will be explained below with reference to FIG. 19. FIG. 19 is a view showing the pipeline structure of the image filtering apparatus according to this embodiment.

The filtering processing unit 11 of this embodiment performs one deblocking filtering process in 20 stages. That is, the filtering processing unit 11 processes data of eight pixels containing one block boundary of the Y image, for example, in 20 stages by one deblocking filtering process by using the processes (e.g., read from the memory 30, the deblocking filtering process, and write to the memory 30) in steps S1 to S4 shown in FIG. 18. The processing in every four steps from step S5 and the processing of the Cb and Cr images (chroma component) are also performed in 20 stages.

As shown in FIG. 12, when performing the deblocking filtering process 16 times on the block boundary BL1 of the Y image, for example, the filtering processing unit 11 of this embodiment starts processing the uppermost 8-pixel pixel group A1 by using a first pipeline PL1, starts processing the second 8-pixel pixel group A2 by using a second pipeline PL2 from the second cycle of the pipeline PL1, and starts processing the third 8-pixel pixel group A3 by using a third pipeline PL3 from the second cycle of the pipeline PL2.

The filtering processing unit 11 starts processing the 16th 8-pixel pixel group A16 by using a 16th pipeline PL16. At this point, the first pipeline PL1 is in the 16th stage, so the uppermost pixel group A1 of the block boundary BL1 has not been completely processed over 20 stages.

Then, the filtering processing unit 11 executes the deblocking filtering process on the block boundary BL1 of the Cb image by using a 17th pipeline PL17. That is, even when the first pipeline processing is not complete, the filtering processing unit 11 can immediately start the processing of the Cb image independent of the processing results by using the 17th pipeline PL17.

Similarly, after performing the deblocking filtering process on the block boundary BL1 of the Cb image by using eight pipelines PL17 to PL20 and PL1 to PL4, the filtering processing unit 11 advances to the deblocking filtering process on the block boundary BL2 of the Y image.

After that, the deblocking filtering process is executed in accordance with the flowchart shown in FIG. 18. As described above, this embodiment can perform the deblocking filtering process on a block boundary of the Cb or Cr image while performing the deblocking filtering process on one block boundary of the Y image. In this manner, this embodiment separates deblocking filtering processes of block boundaries in images having a dependence on each other's data, and successively performs a deblocking filtering process of another image having no dependence. This embodiment can thus increase the total processing speed of the Y, Cb, and Cr images without causing any pipeline stall. That is, this embodiment can raise the frequency by increasing the number of pipeline stages in the deblocking filtering process.

The effect of the pipeline processing of this embodiment significantly appears when compared with the case that images depending on each other are processed.

For example, when continuously performing the pipeline processing on block boundaries of the Y image, the filtering processing unit 11 cannot start the pipeline processing on the next block boundary having a dependence upon the deblocking filtering process of the current block boundary, unless the pipeline processing on the current block boundary is complete.

Accordingly, even when the filtering processing unit 11 tries to start processing the uppermost 8-pixel pixel group A21 of the adjacent block boundary BL2 in the same Y image by using the 17th pipeline PL17, the uppermost pixel group A1 in the block boundary BL1 is still processed in the 17th stage, so the processing over 20 stages is not complete.

To perform the deblocking filtering process on the block boundary BL2, data of eight pixels across this boundary is necessary. However, data of four pixels positioned on the left side of the block boundary BL2 is undetermined unless the block boundary BL1 is completely processed.

The processing of the block boundary BL2 cannot be started, therefore, unless the 20-stage processing of the first pipeline PL1 is complete. That is, a pipeline stall occurs in four stages from the 17th stage to the 20th stage, or in four cycles if one stage is executed in one cycle.

The influence increases as the frequency rises. The reason is as follows. The higher the frequency, the shorter the time of one cycle. This increases the number of cycles required in one deblocking filtering process, so one deblocking filtering process must be divided into a larger number of stages.

On the other hand, this embodiment advances to the block boundary BL1 of the Cb image after performing the deblocking filtering process on the block boundary BL1 of the Y image by using the 16 pipelines PL1 to PL16. Therefore, this embodiment can immediately start processing, by using the 17th pipeline PL17, the Cb image independent of the results of the first pipeline processing, even when the first pipeline processing is not complete.

Likewise, this embodiment advances to the block boundary BL2 of the Y image after performing the deblocking filtering process on the block boundary BL1 of the Cr image by using the eight pipelines PL17 to PL20 and PL1 to PL4. This increases the processing efficiency because the processing can be continuously performed without any pipeline stall regardless of the completion timing of the processing of any of the pipelines PL1 to PL20.

Note that in the present invention, the number of pipeline stages is not limited to 20 and may also be, e.g., 16 (exclusive) to 24 (inclusive). 16 is the value of the processing unit of the Y image, so the present invention is effective if the number of pipeline stages is larger than 16. 24 is the sum total of the processing blocks of the Y image and Cb or Cr image. If the number of pipeline stages is larger than 24, therefore, a pipeline stall occurs.

Note also that the number of pipeline stages that divide one processing is made equal to a maximum number of stages executed in parallel by pipeline processing.

The above embodiment can increase the efficiency of the deblocking filtering process.

Other Embodiments

The above embodiment is merely an example and does not limit the present invention.

For example, this embodiment uses one memory as the memory 30. However, it is also possible to use different memories to store the Y, Cb, and Cr images. Also, data to be processed are not limited to the Y, Cb, and Cr images.

For example, the above embodiment uses the rotating memory. However, the present invention is also applicable to the case that an ordinary memory from which data can be continuously read out in only one direction is used instead of the rotating memory.

Also, this embodiment executes the deblocking filtering process on an image encoded by using H.264. However, the deblocking filtering process is executed on an image using, e.g., MPEG-4 as follows.

MPEG-4 encodes and decodes 8×8 pixels, although the macro block size is the same as H.264. When the MPEG-4 standards are used, therefore, a macro block is divided into 8×8-pixel blocks, and the deblocking filtering process is executed on the block boundaries.

Analogously, when using this embodiment on an image complying with other standards, a macro block is divided in accordance with a pixel block size to be encoded and decoded, and the deblocking filtering process is executed on the block boundaries.

This embodiment also includes the following forms.
- An image processing apparatus in which the number of pipeline stages is 16 (exclusive) to 24 (inclusive).
- An image processing apparatus in which the rotating memory 30 is a 32×32-pixel memory.
- An image processing apparatus capable of executing the deblocking filtering process on an image encoded by using the H.264 standards or MPEG standards.

What is claimed is:

1. An image processing apparatus comprising:
at least one memory which stores data of each of at least Y image and Cb image or Cr image having no dependence upon each other's data;
a memory access unit which reads out the data from and writes the data in said memory; and
a filtering processing unit which receives the data read out by said memory access unit, performs a deblocking filtering process on the received data, and supplies the processed data to said memory access unit,
wherein said filtering processing unit performs a deblocking filtering process on a block boundary of the Y image and a block boundary of the Cb image or Cr image alternately.

2. An apparatus according to claim 1, wherein said memory is configured to be continuously read in a horizontal direction and a vertical direction.

3. An apparatus according to claim 2, wherein the number of pixels of said memory is not less than the number of pixels obtained by adding the numbers of pixels as processing blocks of the deblocking filtering process of the Y image and the Cb image or Cr image.

4. An apparatus according to claim 2, wherein the number of pixels of said memory is not less than the number of pixels obtained by adding the numbers of pixels as processing blocks of the deblocking filtering process of the Y image, the Cb image, and the Cr image.

5. An apparatus according to claim 2, wherein said filtering processing unit altogether executes a deblocking filtering process on the Y image and the Cb image or Cr image for every processing unit of the deblocking filtering process by using an externally supplied block boundary strength.

6. An apparatus according to claim 2, wherein said filtering processing unit altogether executes a deblocking filtering process on the Y image, the Cb image, and the Cr image for every processing unit of the deblocking filtering process by using an externally supplied block boundary strength.

7. An apparatus according to claim 2, wherein
said filtering processing unit has a pipeline with a plurality of stages, the plurality of stages being divided one deblocking filtering process into for performing pipeline processing, and
the number of stages of the pipeline is not more than a sum total of the number of pixels existing along one block boundary of the Y image when performing a deblocking filtering process on the block boundary, and the number of pixels existing along one block boundary of the Cb image or Cr image when performing a deblocking filtering process on the block boundary.

8. An apparatus according to claim 2, wherein
the Y image has as a processing unit a first block including 16×16 pixels, and having block boundaries YBL1, YBL2, YBL3, and YBL4 in a vertical direction, and block boundaries YBL5, YBL6, YBL7, and YBl8 in a horizontal direction,
the Cb image has as a processing unit a second block including 8×8 pixels, and having block boundaries CbBL1 and CbBL2 in the vertical direction, and block boundaries CbBL3 and CbBL4 in the horizontal direction,
the Cr image has as a processing unit a third block including 8×8 pixels, and having block boundaries CrBL1 and CrBL2 in the vertical direction, and block boundaries CrBL3 and CrBL4 in the horizontal direction, and
said filtering processing unit performs a deblocking filtering process on the block boundary YBL1 of the Y image, and then performs a deblocking filtering process on the block boundary CbBL1 of the Cb image,
performs a deblocking filtering process on the block boundary YBL2 of the Y image, and then performs a deblocking filtering process on the block boundary CbBL2 of the Cb image,
performs a deblocking filtering process on the block boundary YBL3 of the Y image, and then performs a deblocking filtering process on the block boundary CrBL1 of the Cr image,
performs a deblocking filtering process on the block boundary YBL4 of the Y image, and then performs a deblocking filtering process on the block boundary CrBL2 of the Cr image,
performs a deblocking filtering process on the block boundary YBL5 of the Y image, and then performs a deblocking filtering process on the block boundary CbBL3 of the Cb image,
performs a deblocking filtering process on the block boundary YBL6 of the Y image, and then performs a deblocking filtering process on the block boundary CbBL4 of the Cb image,
performs a deblocking filtering process on the block boundary YBL7 of the Y image, and then performs a deblocking filtering process on the block boundary CrBL3 of the Cr image, and
performs a deblocking filtering process on the block boundary YBL8 of the Y image, and then performs a deblocking filtering process on the block boundary CrBL4 of the Cr image.

9. An apparatus according to claim 1, wherein the number of pixels of said memory is not less than the number of pixels obtained by adding the numbers of pixels as processing blocks of the deblocking filtering process of the Y image and the Cb image or Cr image.

10. An apparatus according to claim 1, wherein the number of pixels of said memory is not less than the number of pixels obtained by adding the numbers of pixels as processing blocks of the deblocking filtering process of the Y image, the Cb image, and the Cr image.

11. An apparatus according to claim 1, wherein said filtering processing unit altogether executes a deblocking filtering process on the Y image and the Cb image or Cr image for every processing unit of the deblocking filtering process by using an externally supplied block boundary strength.

12. An apparatus according to claim 1, wherein said filtering processing unit altogether executes a deblocking filtering process on the Y image, the Cb image, and the Cr image for every processing unit of the deblocking filtering process by using an externally supplied block boundary strength.

13. An apparatus according to claim 1, wherein
said filtering processing unit has a pipeline with a plurality of stages, the plurality of stages being divided one deblocking filtering process into for performing pipeline processing, and
the number of stages of the pipeline is not more than a sum total of the number of pixels existing along one block boundary of the Y image when performing a deblocking filtering process on the block boundary, and the number of pixels existing along one block boundary of the Cb image or Cr image when performing a deblocking filtering process on the block boundary.

14. An apparatus according to claim 1, wherein
the Y image has as a processing unit a first block including 16×16 pixels, and having block boundaries YBL1, YBL2, YBL3, and YBL4 in a vertical direction, and block boundaries YBL5, YBL6, YBL7, and YBL8 in a horizontal direction,
the Cb image has as a processing unit a second block including 8×8 pixels, and having block boundaries CbBL1 and CbBL2 in the vertical direction, and block boundaries CbBL3 and CbBL4 in the horizontal direction,
the Cr image has as a processing unit a third block including 8×8 pixels, and having block boundaries CrBL1 and CrBL2 in the vertical direction, and block boundaries CrBL3 and CrBL4 in the horizontal direction, and
said filtering processing unit performs a deblocking filtering process on the block boundary YBL1 of the Y image, and then performs a deblocking filtering process on the block boundary CbBL1 of the Cb image, performs a deblocking filtering process on the block boundary YBL2 of the Y image, and then performs a deblocking filtering process on the block boundary CbBL2 of the Cb image, performs a deblocking filtering process on the block boundary YBL3 of the Y image, and then performs a deblocking filtering process on the block boundary CrBL1 of the Cr image, performs a deblocking filtering process on the block boundary YBL4 of the Y image, and then performs a deblocking filtering process on the block boundary CrBL2 of the Cr image, performs a deblocking filtering process on the block boundary YBL5 of the Y image, and then performs a deblocking filtering process on the block boundary CbBL3 of the Cb image, performs a deblocking filtering process on the block boundary YBL6 of the Y image, and then performs a deblocking filtering process on the block boundary CbBL4 of the Cb image, performs a deblocking filtering process on the block boundary YBL7 of the Y image, and then performs a deblocking filtering process on the block boundary CrBL3 of the Cr image, and performs a deblocking filtering process on the block boundary YBL8 of the Y image, and then performs a deblocking filtering process on the block boundary CrBL4 of the Cr image.

* * * * *